Patented Sept. 7, 1937

2,092,677

UNITED STATES PATENT OFFICE 2,092,677

CELLULOSE ACETATE COMPOSITION

Louis E. Lovett, Cleveland Heights, Ohio, assignor to Industrial Rayon Corporation, Cleveland, Ohio, a corporation of Delaware No Drawing. Application August 30, 1934, Serial No. 742,155

6 Claims. (Cl. 106—40)

This invention relates to filaments, ribbons, sheets and other articles formed from solutions or other dispersions of cellulose acetate, as well as to the compositions and methods of making the compositions from which such articles are formed. The invention involves, among other things, the incorporation in solutions or other dispersions of cellulose acetate of various proportions of acetates of polysaccharides other than cellulose; for example, acetates of sucrose. Such acetates may be mixed or otherwise combined in a common liquid vehicle with the cellulose acetate, being in general perfectly compatible therewith, and when so mixed or combined give rise to compositions having the capability of being formed, in much the same manner as solutions of cellulose acetate, into filaments, ribbons, sheets, and other articles having high tensile strengths and other desirable properties.

Cellulose acetate has been formed heretofore into filaments, ribbons, sheets and other articles similar to those made from viscose, but inasmuch as cellulose acetate is a more expensive material than viscose, the regenerated cellulose articles formed from the latter have in general been preferred on account of cheapness despite certain advantages inherent in cellulose acetate such, for example, as its relative impermeability to moisture. It has now been found that the cost of filaments, ribbons, sheets and other articles made from solutions or other dispersions of cellulose acetate may be greatly reduced and the physical properties thereof in many cases considerably improved by the incorporation in the solution or other dispersion of cellulose acetate of various proportions of acetates of polysaccharides other than cellulose, the same having been found to be compatible with the cellulose acetate and to give rise to compositions from which may be formed articles of uniform characteristics.

It is accordingly an object of the present invention to provide articles of improved physical characteristics formed from solutions or other dispersions containing cellulose acetate. Another object of the invention is to provide compositions capable of being extruded and set to form filaments, ribbons, sheets and other articles, such compositions containing not only cellulose acetate but also acetates of polysaccharides other than cellulose. A further object of the invention is to provide a method of preparing less costly solutions or other dispersions of cellulose acetate capable of imparting desirable properties to the articles formed therefrom. Other objects will in part be obvious and will in part appear more fully hereinafter.

Among the acetates of polysaccharides other than cellulose that may be incorporated in solutions or other dispersions of cellulose acetate may be mentioned the various acetates of the polysaccharide sugars, such, for example, as sucrose, maltose, lactose and other disaccharides, the acetates of the trisaccharides raffinose, and the acetates of the tetrasaccharide stachyose. Acetates of still other polysaccharides than those mentioned may also be used, such, for example, as the acetates of cellobiose, starch, inulin, dextrin, gums and the like. Thus, among others, maltose octaacetate, lactose octaacetate and cellobiose octacetate may be incorporated in the solution or other dispersion of the cellulose acetate. Preferably, however, the acetates of sucrose are used, including both the fully acetylated sucrose octaacetate and the less fully acetylated esters such as sucrose monoacetate, diacetate, triacetate, and so on. Good results can also be obtained by mixing or otherwise combining with the cellulose acetate in a liquid vehicle the mixture of acetates of sucrose obtained by acetylating cane or beet sugar, such mixture, termed "acetylated sugar", including various acetates of sucrose in various proportions.

The compositions to which the invention relates may be formed by adding the cellulose acetate, which may be any of the cellulose acetates commonly made, such as the monoacetate, the diacetate, or even the triacetate, to a liquid vehicle, preferably acetone, together with an acetylated polysaccharide other than cellulose and any other ingredients, usually plasticizers or the like, that it may be desired to include in the composition. All of the constituents are thoroughly dissolved or otherwise dispersed in the acetone and the mass is then extruded through appropriate apparatus to form filaments, ribbons, sheets, etc., or otherwise manipulated as may be found desirable. The composition is then set by evaporation of the acetone. Upon examination, the resulting products will be found in many instances to have greater tensile strength than heretofore obtainable by the manipulation of solutions containing only cellulose acetate and plasticizers; i. e., without the addition of acetylated polysaccharides other than cellulose. The exact composition used may be varied within wide limits and many different plasticizers and other substances may be included in the mix without departing from the spirit of the invention.

As illustrative of dispersions that may be made up in accordance with the invention, the accompanying examples are given; but it should be understood that the invention is not limited thereto, procedurally or otherwise.

*Example 1*

The following are dissolved in 5,500 cc. of acetone:

| | Grams |
|---|---|
| Medium viscosity cellulose acetate | 1,000 |
| Sucrose octaacetate | 100 |
| Diethyl phthalate | 300 |
| Glyptal resin | 300 |

All the ingredients are added to the acetone gradually, with constant stirring, until completely dissolved.

*Example 2*

In 540 cc. of acetone are dissolved the following:

| | Grams |
|---|---|
| Medium viscosity cellulose acetate | 90 |
| Sucrose octaacetate | 40 |
| Diethyl phthalate | 10 |

These ingredients are brought into solution in the acetone with constant stirring, as in Example 1.

Flexible transparent films may be formed from the solutions described in the foregoing illustrative examples, as also from other dispersions prepared in a similar manner, by placing the composition in a hopper having a narrow slotted opening and causing the composition to flow through the opening onto a large drum placed immediately thereunder. As the drum is revolved, the composition is deposited thereon in the form of a thin film from which the liquid vehicle is evaporated either by heat supplied from within the drum or by heat from the surrounding atmosphere. Eventually there is left on the drum a thin transparent sheet that may be stripped off continuously. The composition may, if desired, be extruded through a spinneret to form filaments capable of being combined into a thread of artificial silk in the usual manner. The composition may also be manipulated by various other methods to form articles of any desired shapes.

As mentioned, the cellulose acetate used may be the mono-, di-, or triacetate, but the lower acetates produce stronger films than the higher acetates and consequently are preferred for that reason. In the foregoing illustrative examples, an acetone-soluble cellulose acetate is used, as indicated by the use of acetone. The sucrose octaacetate employed in the illustrative examples may be incorporated in the composition to the extent of 50% of the composition of the final set article after the solvent has been removed and this proportion may be further increased where the lower sucrose acetates are used. It will be apparent that the incorporation of such acetylated polysaccharides as sucrose acetate which are less expensive to make than cellulose acetate greatly reduces the cost of films and other articles made therefrom. At the same time, the tensile strength of the product is much increased.

The sucrose acetate of the foregoing examples is not soluble in the cellulose acetate but is compatible therewith, so that a clear, uniform film is obtainable from mixtures thereof, with or without other ingredients such as plasticizers. The sucrose octaacetate may be added to the solution in the form of the pure crystals, which have a bitter taste, but it is observed that a cellulose acetate sheet containing sucrose octaacetate is nevertheless free from the taste of sucrose octaacetate, thus permitting its use in the wrapping of foodstuffs and confections. Sucrose tetraacetate, unlike sucrose octaacetate, is not a crystalline material, but a viscous substance; this, however, constitutes no objection to its use in lieu of or in conjunction with sucrose octaacetate, since it is readily incorporated in the solution and forms a uniform mass with the other ingredients thereof. The sucrose mono-, tri-, penta-, hexa-, and heptaacetates are also suitable, both alone and together with other sucrose acetates.

Various plasticizing agents, such as glycerine, glycerine-phthalic acid resins, polyglycerol, diethyl phthalate, tricresyl phosphate, etc., may also be added to the composition, as may also appropriate pigments, dyes and the like.

It is obvious that numerous changes may be made in the invention as herein described, such changes extending, for example, to the liquid vehicle employed, the amount of cellulose acetate used, the nature of the added acetylated polysaccharides, the kind of plasticizer, etc. Among other things, it is not necessary that all of the ingredients employed in preparing the composition be completely soluble in the liquid vehicle employed: homogeneous dispersions thereof may be used to good advantage in the practice of the invention. Numerous modifications of the procedure employed in forming the final product may also be made; thus instead of forming a sheet, as in the examples given herein, the composition may be used in the production of filaments, ribbons, etc., as well as in other ways obvious to those skilled in the art. It is intended that the patent shall cover, by suitable expression in the appended claims, whatever features of patentable novelty reside in the invention.

What I claim is:

1. A thin, transparent film comprising, in intimate solid admixture, cellulose acetate and sucrose octaacetate, said film being characterized by homogeneity, flexibility and relative impermeability to moisture.

2. A thin, transparent film comprising, in intimate solid admixture, cellulose acetate and an acetylated polysaccharide sugar, said film being characterized by homogeneity, flexibility and relative impermeability to moisture.

3. A thin, transparent film comprising, in intimate solid admixture, cellulose acetate and an acetylated disaccharide, said film being characterized by homogeneity, flexibility and relative impermeability to moisture.

4. A thin, transparent film comprising, in intimate solid admixture, cellulose acetate and acetylated cane or beet sugar, said film being characterized by homogeneity, flexibility and relative impermeability to moisture.

5. A thin, transparent film comprising, in intimate solid admixture, cellulose acetate and a mixture of acetates of sucrose, said film being characterized by homogeneity, flexibility and relative impermeability to moisture.

6. A thin, transparent film comprising, in intimate solid admixture, cellulose acetate and a sucrose acetate, said film being characterized by homogeneity, flexibility and relative impermeability to moisture.

LOUIS E. LOVETT.